United States Patent
Furukawa et al.

(10) Patent No.: US 7,151,063 B2
(45) Date of Patent: Dec. 19, 2006

(54) GLASS FOR MULTILAYER FILM FILTER AND METHOD FOR MANUFACTURING THE GLASS

(75) Inventors: Shigeo Furukawa, Moriguchi (JP); Takaaki Furumochi, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 77 days.

(21) Appl. No.: 10/522,159

(22) PCT Filed: Jul. 13, 2004

(86) PCT No.: PCT/JP2004/010262

§ 371 (c)(1),
(2), (4) Date: Jan. 24, 2005

(87) PCT Pub. No.: WO2005/005335

PCT Pub. Date: Jan. 20, 2005

(65) Prior Publication Data
US 2005/0239627 A1     Oct. 27, 2005

(30) Foreign Application Priority Data
Jul. 14, 2003     (JP) .............................. 2003-196389

(51) Int. Cl.
*C03C 10/10*     (2006.01)

(52) U.S. Cl. ............................ 501/6; 428/426; 65/33.7
(58) Field of Classification Search ................... 501/6; 65/33.7; 428/426
See application file for complete search history.

(56) References Cited

U.S. PATENT DOCUMENTS

| | | | | |
|---|---|---|---|---|
| 6,120,591 | A | * | 9/2000 | Brodkin et al. ................ 106/35 |
| 6,342,302 | B1 | * | 1/2002 | Steidl et al. ................. 428/446 |
| 6,946,414 | B1 | * | 9/2005 | Bitossi et al. ................. 501/21 |
| 7,008,891 | B1 | * | 3/2006 | Kobayashi et al. ............. 501/6 |

FOREIGN PATENT DOCUMENTS

| | | |
|---|---|---|
| JP | 2001-048584 | 2/2001 |
| JP | 2001-066426 | 3/2001 |
| JP | 2001-089184 | 4/2001 |
| JP | 2003-342036 | 12/2003 |
| JP | 2003-342037 | 12/2003 |
| JP | 2004-026580 | 1/2004 |

* cited by examiner

*Primary Examiner*—Karl Group
(74) *Attorney, Agent, or Firm*—Steptoe & Johnson LLP

(57) ABSTRACT

Glass can have a high thermal expansion coefficient when it is made up of $SiO_2$, $B_2O_3$, $Na_2O$, $K_2O$, MgO and $Al_2O_3$; contains a partial crystal; and has a mean linear expansion coefficient not lower than of $125 \times 10^{-7} K^{-1}$ in a temperature range of 50° C. to 150° C. Using this glass as a substrate for a multilayer film filter can fully reduce temperature fluctuations in the filter properties.

5 Claims, 2 Drawing Sheets

GLASS FOR MULTILAYER FILM FILTER AND METHOD FOR MANUFACTURING THE GLASS

TECHNICAL FIELD

The present invention relates to glass for a multilayer film filter and a method for manufacturing the glass.

BACKGROUND ART

A multilayer film filter transmits or blocks light having a specific wavelength, or changes light intensity regardless of wavelengths. Multilayer film filter chips are obtained by alternately forming low refractive index films such as $SiO_2$ and high refractive index films such as $TiO_2$ or $Ta_2O_5$ onto the top surface of a substrate by sputtering or evaporation, and then by dividing with a dicing cutter.

The conventional glass substrate for a multilayer film filter has a large thermal expansion coefficient. The reason for this is to reduce the amount of shift in filtering properties with temperature changes (hereinafter referred to as wavelength shift). An example of glass of this type is disclosed in Japanese Patent Laid-Open Application No. 2001-48584.

FIGS. 1 and 2 show changes in filter properties with temperature changes. In many filters, as shown in FIG. 1, filtering properties 21 make a large shift in the positive direction with a temperature increase so as to change into filtering properties 22. A large amount of shift means that the filter properties change greatly with temperature changes. Therefore, when the wavelength shift is large, the filter can be used as a filter having required properties only in a narrow temperature range. In other words, a filter making wavelength shift closer to 0 can be used as a filter having required properties in a wider temperature range.

It is known that the larger the thermal expansion coefficient of the glass for a multilayer film filter than the thermal expansion coefficient of the multilayer film is, the longer the wavelength shift which occurs in the negative direction becomes. On the other hand, the thermal expansion coefficient of the glass used as a substrate is generally around $100 \times 10^{-7}$/° C. in the temperature range of 50° C. to 150° C., and the wavelength shift often has a positive value. When the wavelength shift occurs in the positive direction, a substrate having a thermal expansion coefficient not lower than $100 \times 10^{-7}$/° C. is required for having the shift value close to 0.

In a case where more complicated properties are required as the filter properties, it is necessary to increase the number of layers in the multilayer film, thus leading to an increase in film thickness as a whole. In general, in forming a multilayer film onto the glass for a multilayer film filter, the amount of wavelength shift increases with increasing thickness of the multilayer film. From this reason, the thermal expansion coefficient of the glass for a multilayer film filter is preferably larger than that of the conventional glass material. Using such glass having the larger thermal expansion coefficient makes it possible to obtain a filter having a small shift as shown between filter properties 31 at a low temperature and filter properties 32 after a temperature rise in FIG. 2.

On the other hand, it is possible to maintain light transmittance and to improve the thermal expansion coefficient by crystallizing the glass partially to make small particles which have a large thermal expansion coefficient for a multilayer film filter. Such partially crystallized glass is sometimes used as the glass for a multilayer film filter. Even in that case, the highest thermal expansion coefficient of the partially crystallized glass is about $125 \times 10^{-7}$/° C. in a temperature range of 50° C. to 150° C. so far, and there are cases where the wavelength shift of the multilayer film filter cannot be fully reduced.

SUMMARY OF THE INVENTION

Glass for a multilayer film filter according to the present invention is partially crystallized glass which is made from $SiO_2$, $B_2O_3$, $Na_2O$, $K_2O$, MgO and $Al_2O_3$ and has a mean linear expansion coefficient of not lower than $125 \times 10^{-7} K^{-1}$ in the temperature range of 50° C. to 150° C. In this composition, potassium aluminum silicate base crystals are partially precipitated, so as to make the thermal expansion coefficient of the glass high. Such glass can be obtained by cooling and solidifying a glass melt so as to form glass; immediately cooling the obtained glass slowly; heating the glass up to a temperature higher than its glass transition temperature and keeping the temperature for a prescribed period of time; and slowly cooling the glass at a prescribed rate.

DETAILED DESCRIPTION OF PREFERRED EMBODIMENT

Figure 1:
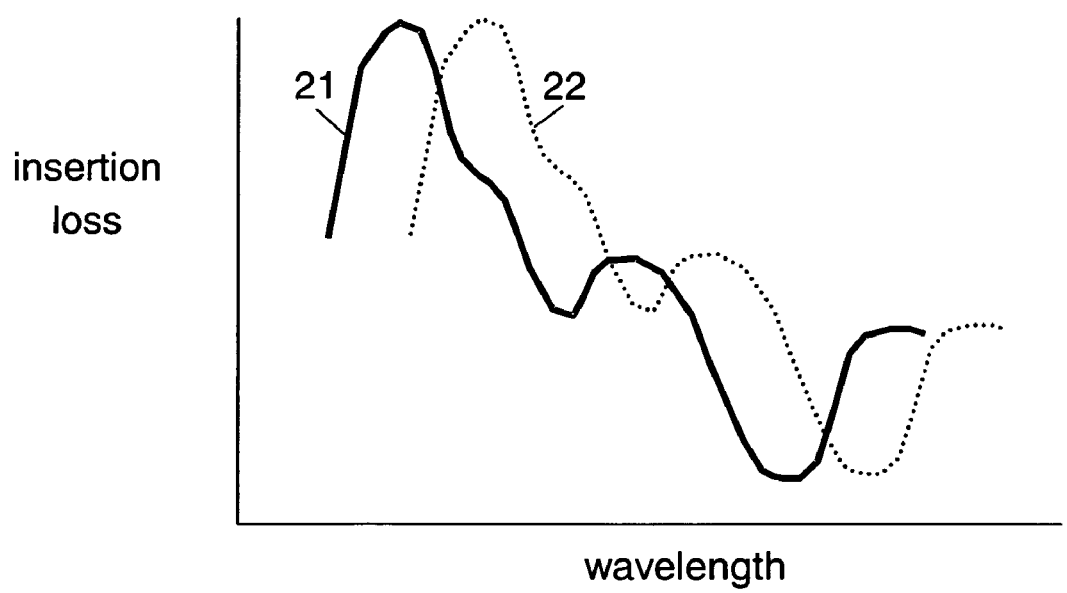
FIGS. 1 and 2 show changes in filter properties with temperature changes.
Figure 2:
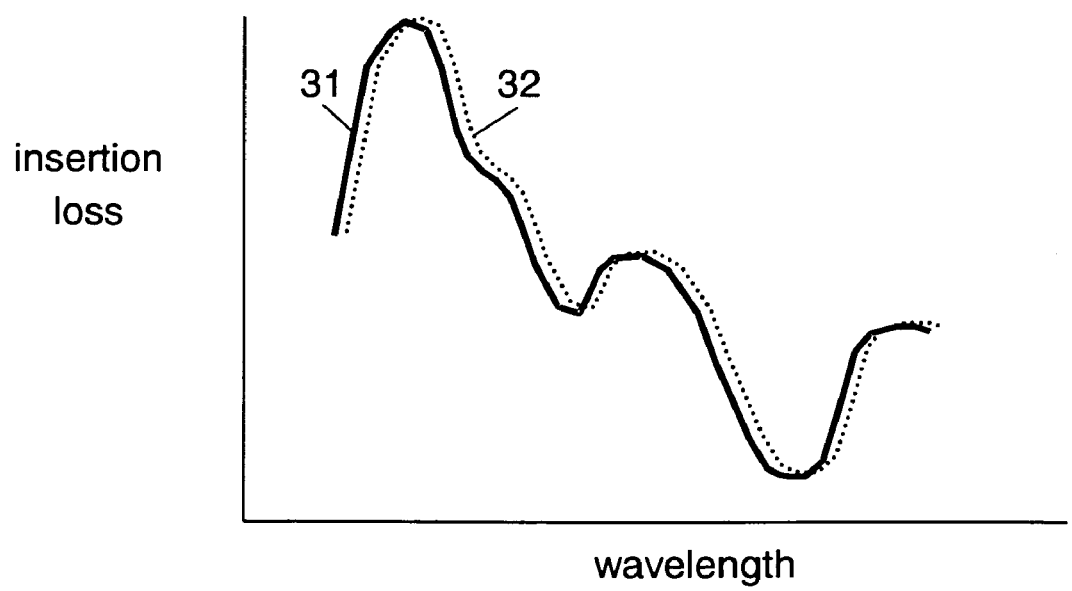
Figure 3:
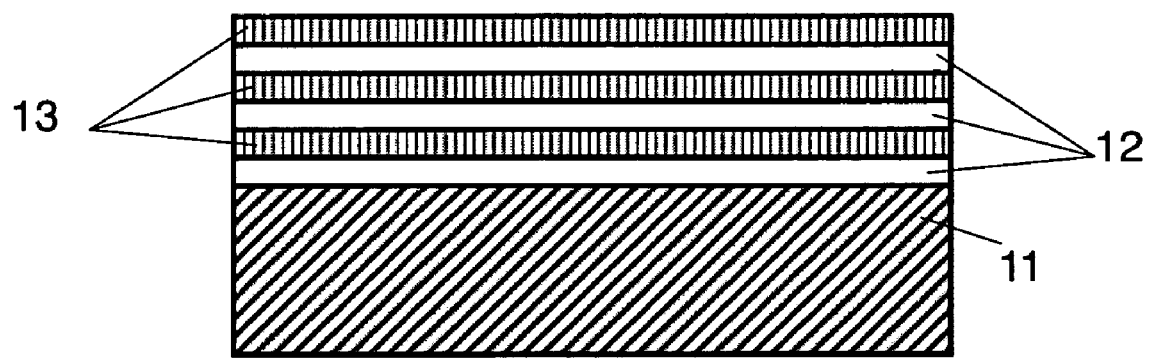
FIG. 3 is a cross sectional schematic view of a multilayer film filter chip using a glass as a substrate according to an embodiment of the present invention.

As shown in FIG. 3, a multilayer film filter chip is obtained by alternately forming low refractive index films 12 and high refractive index films 13 onto the top surface of substrate 11 by sputtering or evaporation, and then by dividing with a dicing.

The glass used as substrate 11 is prepared as follows. First of all, $SiO_2$, $B_2O_3$, $Na_2O$, $K_2O$, MgO and $Al_2O_3$ as glass ingredients are mixed in various compositions that weigh 200 g in total. The mixture of glass ingredients is melted for 30 minutes at 1550° C., poured into molds, quenched for vitrification and immediately annealed over 24 hours from a glass transition temperature to room temperature. This results in glass blocks from which the remaining strain has been removed.

Next, the glass blocks are subjected to a reheating treatment for crystallization. In that case, the glass blocks are put in a furnace for the reheating treatment, heated from the room temperature up to a retention temperature over the glass transition temperature at 100° C./h, kept at the temperature for a fixed period of time and annealed to the room temperature. This reheating treatment is applied to the glass compositions under some different retention temperatures, retention times and slow cooling rates.

The following is a description of the compositions of the partially crystallized glass. In each glass, $SiO_2$ and $B_2O_3$ function as glass forming oxides. When the amounts of $SiO_2$ and $B_2O_3$ added are very small, the mixture of glass ingredients does not melt, or even if it melts, the melt crystallizes immediately when it is poured into the molds and does not vitrify. In contrast, when the amounts are very large, the glass does not crystallize in the reheating treatment process. When the amount of $B_2O_3$ is very small relative to the amount of $SiO_2$, the glass melting temperature increases, making it difficult to obtain uniform glass. In contrast, when the amount of $B_2O_3$ is very large relative to the amount of $SiO_2$, phase separation can occur while the mixture of glass ingredients is melted. Even when the mixture of glass ingredients successfully forms into glass, the glass does not crystallize in the subsequent reheating treatment process.

$K_2O$ has the effect of increasing the thermal expansion coefficient of glass, and becomes a component of crystals to be formed at the reheating treatment. However, adding a very large amount of $K_2O$ is unpreferable because it deteriorates the water durability of the glass. $Na_2O$ has the function of decreasing the glass melting temperature and increasing the thermal expansion coefficient; however, its effect of increasing the thermal expansion coefficient is not so large as that of $K_2O$. Therefore, when the amount of $Na_2O$ added is very large relative to $K_2O$, the linear expansion coefficient of the glass is not large enough. Furthermore, adding a very large amount of $Na_2O$ deteriorates the water durability of the glass. When the total amount of $Na_2O$ and $K_2O$ added is very small, it becomes difficult to melt the mixture of glass ingredients. In contrast, the total amount is very large, the glass melt is prone to crystallize at the time of being poured into the molds, and also decreases the water durability of the glass.

MgO has the effect of facilitating the partial crystallization of glass in the reheating treatment process. However, adding a very large amount of MgO is unpreferable because it causes rapid crystal precipitation in the reheating treatment process, thus developing cracks in the glass, or it makes the glass melt to crystallize at the time of being poured into the molds. In contrast, adding a very small amount of MgO makes it difficult for the glass to crystallize in the reheating treatment process.

$Al_2O_3$ has the effect of improving the water durability of glass so as to facilitate glass formation, and is also a component of crystals to be formed. It is unpreferable to add a very large amount of $Al_2O_3$ because it increases the glass melting temperature. It is also unpreferable to add a very large amount of $Al_2O_3$ because it causes the glass to crystallize rapidly in the reheating treatment process, thus inducing local strain in the glass, and eventually cracks.

The following is a method for evaluating partially crystallized glass thus manufactured. The obtained partially crystallized glass is processed into a substrate of 15 mm×15 mm×1 mm, and the surface is mirror polished so as to measure the transmittance of incident light with wavelengths of 1300 nm to 1600 nm. Then, on the substrate of the partially crystallized glass, $SiO_2$ films as low refractive index layers and $Ta_2O_5$ films as high refractive index layers are formed alternately to make a multilayer film filter with a total thickness of 26 μm and a multilayer film filter with a total thickness of 52 μm. These multilayer film filters are cut into a size of 1.5 mm×1.5 mm. The filtering properties of these pieces are evaluated at 20° C. and 80° C. in wavelengths of 1510 nm to 1580 nm so as to calculate temperature dependence of the amount of wavelength shift.

In addition, the presence or absence of cracks after the reheating treatment is checked macroscopicly. The thermal expansion coefficient of each glass sample is measured with a thermal mechanical analyzer (TMA). The presence or absence of crystals in the glass is also measured by checking the presence or absence of diffraction peaks in X-ray diffraction measurement. In order to examine the water durability of the glass, first of all, the glass samples are formed into blocks of 10 mm×10 mm×2 mm, and then the surfaces are mirror-polished. These blocks are put in a high-temperature high-humidity chamber of 95° C. and 65% of RH to check whether the block surfaces become opaque due to the elution of a glass component.

The compositions, evaluation results and the like of the obtained samples are shown in Tables 1 and 2.

TABLE 1

| No. | Composition (mol %) | | | | | | appearance after casting molds | α before reheating ($10^{-7} K^{-1}$) | retention temperature (° C) |
|---|---|---|---|---|---|---|---|---|---|
| | $SiO_2$ | $B_2O_3$ | $Na_2O$ | $K_2O$ | MgO | $Al_2O_3$ | | | |
| 1 | 33.0 | 0.0 | 15.0 | 15.0 | 32.0 | 5.0 | not melt | — | — |
| 2 | 36.0 | 3.0 | 13.0 | 13.0 | 30.0 | 5.0 | crystallized | — | — |
| 3 | 37.5 | 5.0 | 12.5 | 12.5 | 30.0 | 5.0 | transparent | 117.7 | 540 |
| 4 | 37.5 | 5.0 | 11.0 | 11.0 | 35.0 | 5.0 | transparent | 100.3 | 530 |
| 5 | 40.0 | 2.5 | 12.5 | 12.5 | 22.5 | 10.0 | transparent | 107.2 | 570 |
| 6 | 43.0 | 2.0 | 12.5 | 12.5 | 22.0 | 8.0 | transparent | 111.5 | 550 |
| 7 | 44.0 | 2.0 | 12.5 | 12.5 | 22.0 | 7.0 | transparent | 109.2 | 590 |
| 8 | 40.0 | 0.0 | 15.0 | 15.0 | 20.0 | 5.0 | not melt | — | — |
| 9 | 40.0 | 1.0 | 15.0 | 15.0 | 19.0 | 5.0 | not melt | — | — |
| 10 | 40.0 | 5.0 | 12.5 | 12.5 | 25.0 | 5.0 | transparent | 112.3 | 550 |
| 11 | 40.0 | 6.0 | 12.5 | 12.5 | 24.0 | 5.0 | transparent | 110.1 | 550 |
| 12 | 42.5 | 2.5 | 3.0 | 22.0 | 22.0 | 8.0 | not melt | — | — |
| 13 | 42.5 | 2.5 | 6.0 | 21.0 | 21.0 | 7.0 | transparent | 104.5 | 600 |
| 14 | 42.5 | 2.5 | 6.0 | 19.0 | 22.0 | 8.0 | transparent | 107.2 | 630 |
| 15 | 42.5 | 2.5 | 8.0 | 17.0 | 22.0 | 8.0 | transparent | 109.8 | 600 |
| 16 | 42.5 | 2.5 | 10.0 | 15.0 | 22.0 | 8.0 | transparent | 111.6 | 570 |
| 17 | 42.5 | 2.5 | 15.0 | 10.0 | 22.0 | 8.0 | transparent | 114.9 | 560 |
| 18 | 42.5 | 2.5 | 17.0 | 8.0 | 22.0 | 8.0 | transparent | 115.1 | 580 |
| 19 | 42.5 | 2.5 | 19.0 | 6.0 | 22.0 | 8.0 | transparent | 112.9 | 570 |
| 20 | 42.5 | 2.5 | 20.0 | 5.0 | 22.0 | 8.0 | transparent | 109.8 | 560 |
| 21 | 42.5 | 2.5 | 21.0 | 4.0 | 22.0 | 8.0 | transparent | 107.8 | 560 |
| 22 | 42.5 | 2.5 | 23.0 | 2.0 | 22.0 | 8.0 | transparent | 107.8 | 560 |
| 23 | 40.0 | 10.0 | 7.5 | 7.5 | 30.0 | 5.0 | not melt | — | — |
| 24 | 42.5 | 2.5 | 6.0 | 14.0 | 30.0 | 5.0 | transparent | 99.8 | 550 |
| 25 | 42.5 | 2.5 | 7.0 | 15.0 | 28.0 | 5.0 | transparent | 101.2 | 550 |
| 26 | 42.5 | 2.5 | 13.0 | 14.0 | 23.0 | 5.0 | transparent | 121.8 | 580 |
| 27 | 42.5 | 2.5 | 14.0 | 14.0 | 22.0 | 5.0 | transparent | 129.8 | 580 |
| 28 | 42.5 | 2.5 | 14.0 | 15.0 | 21.0 | 5.0 | transparent | 137.6 | 590 |

TABLE 1-continued

| No. | Composition (mol %) | | | | | | appearance after casting molds | α before reheating ($10^{-7}$ K$^{-1}$) | retention temperature (° C) |
|---|---|---|---|---|---|---|---|---|---|
| | SiO$_2$ | B$_2$O$_3$ | Na$_2$O | K$_2$O | MgO | Al$_2$O$_3$ | | | |
| 29 | 42.5 | 2.5 | 12.5 | 12.5 | 20.0 | 10.0 | transparent | 112.0 | 590 |
| 30 | 42.5 | 2.5 | 12.5 | 12.5 | 21.0 | 9.0 | transparent | 111.7 | 590 |
| 31 | 42.5 | 2.5 | 12.5 | 12.5 | 25.0 | 5.0 | transparent | 111.2 | 560 |
| 32 | 37.5 | 2.5 | 12.5 | 12.5 | 30.0 | 5.0 | transparent | 111.9 | 540 |
| 33 | 37.5 | 2.5 | 12.5 | 12.5 | 31.0 | 4.0 | transparent | 111.1 | 520 |
| 34 | 37.5 | 2.5 | 10.0 | 10.0 | 38.0 | 2.0 | transparent | 110.8 | 520 |
| 35 | 37.5 | 2.5 | 8.5 | 8.5 | 41.0 | 2.0 | not melt | — | — |
| 36 | 42.5 | 2.5 | 12.5 | 12.5 | 27.5 | 2.5 | transparent | 106.9 | 570 |
| 37 | 42.5 | 2.5 | 12.5 | 12.5 | 27.0 | 3.0 | transparent | 106.5 | 570 |
| 38 | 40.0 | 5.0 | 12.5 | 12.5 | 25.0 | 5.0 | transparent | 115.8 | 620 |
| 39 | 41.0 | 2.5 | 12.5 | 12.5 | 21.5 | 10.0 | transparent | 107.2 | 630 |
| 40 | 40.0 | 2.5 | 12.5 | 12.5 | 21.5 | 11.0 | transparent | 106.8 | 630 |
| 41 | 40.0 | 2.5 | 10.0 | 12.5 | 22.0 | 13.0 | not melt | — | — |

TABLE 2

| No. | appearance after reheating | crystal precipitation | Weathering | α after reheating ($10^{-7}$ K$^{-1}$) | internal transmittance (%) | wavelength shift 1 (pm/° C.) | wavelength shift 2 (pm/° C.) |
|---|---|---|---|---|---|---|---|
| 3 | faintly opaque | A, B | none | 142.0 | 97.1 | −2.0 | −0.1 |
| 4 | faintly opaque | A, B | none | 126.0 | 97.5 | −0.1 | 1.9 |
| 5 | faintly opaque | A, B | none | 129.0 | 97.9 | −0.2 | 1.7 |
| 6 | faintly opaque | A, B | none | 135.7 | 98.6 | −1.7 | 0.2 |
| 7 | transparent | none | none | 109.4 | 99.4 | 2.1 | 4.0 |
| 10 | faintly opaque | A, B | none | 126.0 | 97.7 | −0.2 | 1.6 |
| 11 | transparent | none | none | 109.8 | 97.9 | 1.6 | 3.8 |
| 13 | faintly opaque | A, B | present | 165.0 | 98.0 | −3.2 | −1.2 |
| 14 | faintly opaque | A, B | none | 151.0 | 97.5 | −2.5 | −0.6 |
| 15 | faintly opaque | A, B | none | 147.1 | 97.1 | −2.6 | −0.6 |
| 16 | faintly opaque | A, B | none | 147.2 | 97.8 | −2.5 | −0.7 |
| 17 | faintly opaque | A, B | none | 138.1 | 97.3 | −1.7 | 0.2 |
| 18 | faintly opaque | A, B | none | 131.2 | 97.2 | −0.9 | 0.9 |
| 19 | faintly opaque | A, B | none | 123.8 | 97.2 | 0.2 | 2.0 |
| 20 | faintly opaque | A, B | none | 120.5 | 97.2 | 0.3 | 2.3 |
| 21 | faintly opaque | A, B | none | 118.2 | 97.1 | 0.6 | 2.5 |
| 22 | transparent | A, B | present | 120.0 | — | — | — |
| 24 | faintly opaque | A, B | none | 122.5 | 97.7 | 0.4 | 2.2 |
| 25 | faintly opaque | A, B | none | 127.8 | 97.7 | −0.4 | 1.6 |
| 26 | faintly opaque | A, B | none | 143.2 | 97.6 | −2.3 | −0.3 |
| 27 | faintly opaque | A, B | present | 147.8 | 97.6 | −2.5 | −0.5 |
| 28 | faintly opaque | A, B | present | 153.4 | 97.7 | −2.8 | −0.9 |
| 29 | transparent | none | none | 112.8 | 99.8 | 1.5 | 3.5 |
| 30 | faintly opaque | A, B | none | 138.8 | 98.3 | −1.8 | 0.4 |
| 31 | faintly opaque | A, B | none | 140.4 | 98.4 | −2.0 | −0.1 |
| 32 | faintly opaque | A, B | none | 142.3 | 97.5 | −2.2 | −0.2 |
| 33 | faintly opaque | A, B | none | 144.1 | 97.5 | −2.3 | −0.2 |
| 34 | cracks | A, B | none | — | — | — | — |
| 36 | transparent | none | none | 107.7 | 98.5 | 2.3 | 4.0 |
| 37 | faintly opaque | A, B | none | 139.2 | 98.3 | −1.7 | 0.4 |
| 38 | faintly opaque | A, B | none | 130.8 | 97.9 | −0.6 | 0.9 |
| 39 | faintly opaque | A, B | none | 135.4 | 97.9 | −1.5 | 0.5 |
| 40 | cracks | A, B | — | — | — | — | — |

In the column of crystal precipitation in Table 2, "A" represents $K_{1.25}Al_{1.25}Si_{0.75}O_4$, and "B" represents KAlSiO$_4$.

As in Sample 2, when the SiO$_4$ content is less than 37 mol %, the glass melt crystallizes at the time of being poured into the mold. In contrast, as in Sample 7, when the content exceeds 43 mol %, the glass does not crystallize in the reheating treatment process.

As in Samples 8 and 9, when the B$_2$O$_3$ content is less than 2 mol %, the melting temperature is too high to obtain uniform glass. In contrast, as in Sample 11, when the content exceeds 5 mol %, the glass does not crystallize in the reheating treatment process.

As in Sample 12, when the Na$_2$O content is less than 5 mol %, the mixture of glass ingredients does not melt uniformly. In contrast, as in Samples 21 and 22, when the content exceeds 20 mol %, the linear expansion coefficient does not reach $125 \times 10^{-7}$ K$^{-1}$ even after the glass is partially crystallized. As in Samples 19 and 20, when the K$_2$O content is less than 7 mol %, the linear expansion coefficient is not large enough even after the glass is partially crystallized. In contrast, as in Sample 13, when the content exceeds 20 mol %, the water durability of the glass decreases. As in Samples 23 and 24, when the sum of the $Na_2O$ content and the $K_2O$ content is less than 21 mol %, the mixture of glass ingredients does not melt uniformly or the linear expansion coefficient of the partially crystallized glass is not large enough. On the other hand, as in Samples 27 and 28, when the sum of the contents exceeds 27 mol %, the water durability of the glass decreases.

As in Sample 29, when the MgO content is less than 21 mol %, crystal precipitation does not occur in the glass after the reheating treatment. In contrast, as in Samples 34 and 35, when the content exceeds 37 mol %, crystal precipitation occurs rapidly in the reheating treatment process, thus inducing cracks in the glass. When the MgO content is particularly large, the glass melt crystallizes at the time of being poured into the molds.

As in Sample 36, when the $Al_2O_3$ content is less than 3 mol %, crystal precipitation does not occur in the glass in the reheating treatment process. In contrast, as in Sample 40, when the content exceeds 10 mol %, crystal precipitation occurs rapidly in the reheating treatment process, thus inducing cracks in the glass. When the content is particularly large, it is difficult to melt the mixture of glass ingredients as in Sample 41.

In the samples having crystal precipitation, the precipitated crystals are mainly potassium aluminum silicate base $K_{1.25}Al_{1.25}Si_{0.75}O_4$ or $KAlSiO_4$. The precipitation of these crystals increases the linear expansion coefficient, as compared with the glass that has not been crystallized yet.

The following is a description about the influence of the retention time in the reheating treatment process and the rate of the slow cooling subsequent to the reheating treatment process on the thermal expansion coefficient and transmittance of the partially crystallized glass. As an example, of the samples shown in Table 1, the glasses of Samples 5, 6, 13–19 and 38 are used to measure the thermal expansion coefficient and transmittance value of the partially crystallized glasses which are obtained while changing the retention time and slow cooling rate. The results are shown in Tables 3 and 4.

TABLE 3

| No. | retention temperature (° C.) | retention time (h) | cooling rate (° C./h) | appearance | α after reheating ($10^{-7} K^{-1}$) | transmittance (%/mm) |
|---|---|---|---|---|---|---|
| 5 | 550 | 1 | −10 | transparent | 106.0 | 99.3 |
|   | 560 | 1 | −10 | cracks | — | — |
|   | 570 | 1 | −10 | faintly opaque | 129.0 | 97.9 |
|   | 580 | 1 | −10 | faintly opaque | 126.0 | 97.1 |
|   | 590 | 1 | −10 | cracks | — | — |
|   | 600 | 1 | −10 | faintly opaque | 121.0 | 96.0 |
|   | 540 | 10 | −10 | cracks | — | — |
|   | 550 | 1 | −10 | cracks | — | — |
| 6 | 510 | 10 | −10 | transparent | 110.9 | 99.4 |
|   | 520 | 10 | −10 | faintly opaque | 116.2 | 98.9 |
|   | 530 | 10 | −10 | faintly opaque | 134.5 | 98.8 |
|   | 550 | 10 | −10 | faintly opaque | 135.7 | 98.6 |
| 13 | 540 | 5 | −100 | transparent | 115.7 | 99.5 |
|   | 560 | 5 | −100 | faintly opaque | 145.5 | 97.9 |
|   | 580 | 5 | −100 | cracks | — | — |
|   | 600 | 5 | −100 | faintly opaque | 165.0 | 98.0 |
|   | 620 | 5 | −100 | faintly opaque | 159.7 |   |
|   | 590 | 0.5 | −10 | cracks | — | — |
|   | 600 | 0.5 | −10 | cracks | — | — |
|   | 620 | 0.5 | −10 | faintly opaque | 162.9 | 98.1 |
| 14 | 590 | 5 | −100 | transparent | 106.3 | 99.1 |
|   | 620 | 5 | −100 | faintly opaque | 148.0 | 97.8 |
|   | 630 | 5 | −100 | faintly opaque | 151.0 | 97.5 |
|   | 640 | 5 | −100 | faintly opaque | 144.9 | 97.0 |
|   | 570 | 2 | −5 | faintly opaque | 162.9 | 97.7 |
|   | 575 | 2 | −5 | faintly opaque | 162.0 | 97.5 |
| 15 | 540 | 5 | −100 | transparent | 113.7 | 99.1 |
|   | 580 | 5 | −100 | faintly opaque | 148.7 | 97.2 |
|   | 600 | 5 | −100 | opaque | 143.7 | 84.2 |
|   | 560 | 5 | −100 | cracks | — | — |
|   | 590 | 1 | −10 | faintly opaque | 141.7 | 97.5 |
|   | 600 | 1 | −10 | faintly opaque | 147.1 | 97.1 |
|   | 580 | 2 | −5 | faintly opaque | 151.0 | 97.1 |

TABLE 4

| No. | retention temperature (° C.) | retention time (h) | cooling rate (° C./h) | appearance | α after reheating ($10^{-7} K^{-1}$) | transmittance (%/mm) |
|---|---|---|---|---|---|---|
| 16 | 540 | 5 | −100 | transparent | 113.7 | 99.3 |
|   | 570 | 5 | −100 | faintly opaque | 147.2 | 97.8 |
|   | 580 | 5 | −100 | faintly opaque | 143.6 | 97.1 |
|   | 590 | 5 | −100 | faintly opaque | 143.7 | 96.4 |
|   | 560 | 5 | −100 | cracks | — | — |
| 17 | 530 | 5 | −100 | faintly opaque | 129.3 | 98.2 |
|   | 540 | 5 | −100 | faintly opaque | 133.1 | 97.6 |

TABLE 4-continued

| No. | retention temperature (° C.) | retention time (h) | cooling rate (° C./h) | appearance | α after reheating ($10^{-7}$ K$^{-1}$) | transmittance (%/mm) |
|---|---|---|---|---|---|---|
|  | 560 | 5 | −100 | faintLy opaque | 138.1 | 97.3 |
|  | 570 | 5 | −100 | faintly opaque | 133.0 | 96.8 |
|  | 580 | 5 | −100 | faintly opaque | 133.5 | 95.1 |
| 18 | 540 | 5 | −100 | faintly opaque | 127.6 | 97.8 |
|  | 580 | 5 | −100 | faintly opaque | 134.2 | 97.2 |
|  | 590 | 5 | −100 | faintly opaque | 124.9 | 96.1 |
| 19 | 530 | 5 | −100 | faintly opaque | 127.8 | 97.8 |
|  | 540 | 5 | −100 | faintly opaque | 129.4 | 97.6 |
|  | 560 | 5 | −100 | faintly opaque | 129.1 | 97.5 |
|  | 570 | 5 | −100 | faintly opaque | 133.8 | 97.2 |
|  | 580 | 5 | −100 | faintly opaque | 129.1 | 95.4 |
| 38 | 520 | 5 | −100 | transparent | 113.4 | 99.4 |
|  | 550 | 5 | −100 | transparent | 103.5 | 99.4 |
|  | 600 | 5 | −100 | transparent | 113.3 | 99.0 |
|  | 610 | 5 | −100 | faintly opaque | 120.7 | 98.2 |
|  | 620 | 5 | −100 | faintly opaque | 130.8 | 97.9 |

As shown in Tables 3 and 4, as a whole, when the retention temperature in the reheating treatment process is very low, there is no crystal precipitation, whereas when the temperature is very high, too much crystal is precipitated, thus greatly decreasing the transmittance. In Samples 6 and 38, the thermal expansion coefficient increases with decreasing transmittance, but it hardly changes from a certain point forward. In Samples 5 and 13–19, the thermal expansion coefficient begins to decrease from a certain point forward.

By thus optimizing the retention temperature and slow cooling rate in the reheating treatment process, partially crystallized glass can be obtained in a stable manner without causing local strain or cracks. In addition, a maximum thermal expansion coefficient and sufficiently high transmittance of the partially crystallized glass can be maintained. This results in partially crystallized glass effective to reduce the temperature dependence of the wavelength shift which is usually positive in a multilayer film filter.

INDUSTRIAL APPLICABILITY

As described hereinbefore, the present invention provides partially crystallized glass which is made up of $SiO_2$, $B_2O_3$, $Na_2O$, $K_2O$, MgO and $Al_2O_3$, and which has a mean linear expansion coefficient not lower than $125\times10^{-7}$K$^{-1}$ in the temperature range of 50° C. to 150° C. In this partially crystallized glass, potassium aluminum silicate base crystals are precipitated in some parts of the glass, so that the thermal expansion coefficient is high. Therefore, using the glass as a substrate for a multilayer film filter can fully reduce temperature fluctuations in the filter properties.

The invention claimed is:

1. Glass for a multilayer film filter comprising:
$SiO_2$, $B_2O_3$, $Na_2O$, $K_2O$, MgO and $Al_2O_3$, wherein
 a $SiO_2$ content is not less than 37 mol % nor more than 43 mol %;
 a $B_2O_3$ content is not less than 2 mol % nor more than 5 mol %;
 $Na_2O$ content is not less than 5 mol % nor more than 20 mol %;
 a $K_2O$ content is not less than 7 mol % nor more than 20 mol %;
 a sum of the $Na_2O$ content and the $K_2O$ content is not less than 21 mol % nor more than 27 mol %;
 a MgO content is not less than 21 mol % nor more than 37 mol %; and
 a $Al_2O_3$ content is not less than 3 mol % nor more than 10 mol %; and
 the glass contains a partial crystal, and a mean linear expansion coefficient of the glass is not lower than $125\times10^{-7}$ K$^{-1}$ in a temperature range of 50° C. to 150° C.

2. The glass for the multilayer film filter according to claim 1, wherein
 the partial crystal is a potassium aluminum silicate base crystal.

3. A method for manufacturing glass for a multilayer film filter, the method comprising:
 A) preparing glass by cooling and solidifying a glass melt made up of $SiO_2$, $B_2O_3$, $Na_2O$, $K_2O$, MgO and $Al_2O_3$;
 B) immediately cooling the glass slowly;
 C) heating the slowly cooled glass up to a temperature higher than a glass transition temperature;
 D) keeping the heated glass at the temperature higher than the glass transition temperature for a fixed period of time;
 E) slowly cooling the glass kept at the temperature higher than the glass transition temperature for the fixed period of time so as to obtain partially crystallized glass, wherein
 a $SiO_2$ content is not less than 37 mol % nor more than 43 mol %;
 a $B_2O_3$ content is not less than 2 mol % nor more than 5 mol %;
 $Na_2O$ content is not less than 5 mol % nor more than 20 mol %;
 a $K_2O$ content is not less than 7 mol % nor more than 20 mol %;
 a sum of the $Na_2O$ content and the $K_2O$ content is not less than 21 mol % nor more than 27 mol %;
 a MgO content is not less than 21 mol % nor more than 37 mol %; and
 a $Al_2O_3$ content is not less than 3 mol % nor more than 10 mol %; and
 the keeping temperature in step D and a slow cooling rate in step E are so set as to make a mean linear expansion coefficient of the partially crystallized glass not lower than $125\times10^{-7}$K$^{-1}$.

4. The method for manufacturing glass for the multilayer film filter according to claim 3, wherein the keeping temperature in step D and the slow cooling rate in step E are so set that the partially crystallized glass with a thickness of 1 mm has a transmittance of not less than 97% in a wavelength range of 1300 nm to 1600 nm.

5. A multilayer film filter comprising:
a substrate made of glass comprising:
$SiO_2$, $B_2O_3$, $Na_2O$, $K_2O$, MgO and $Al_2O_3$, wherein
a $SiO_2$ content is not less than 37 mol % nor more than 43 mol %;
a $B_2O_3$ content is not less than 2 mol % nor more than 5 mol %;
$Na_2O$ content is not less than 5 mol % nor more than 20 mol %;
a $K_2O$ content is not less than 7 mol % nor more than 20 mol %;
a sum of the $Na_2O$ content and the $K_2O$ content is not less than 21 mol % nor more than 27 mol %;
a MgO content is not less than 21 mol % nor more than 37 mol %; and
a $Al_2O_3$ content is not less than 3 mol % nor more than 10 mol %; and
the glass contains a partial crystal, and a mean linear expansion coefficient of the glass is not lower than $125 \times 10^{-7} K^{-1}$ in a temperature range of 50° C. to 150° C.;
a plurality of low refractive index films; and
a plurality of high refractive index films each having a higher refractive index than the low refractive index films, wherein the low refractive index films and the high refractive index films are alternatively formed on the substrate.

* * * * *